United States Patent [19]

Molz et al.

[11] Patent Number: 5,547,587
[45] Date of Patent: Aug. 20, 1996

[54] PROCESS FOR DENATURING AND COAGULATING PAINTS

[75] Inventors: Thomas Molz; Hans-Joergen Rehm, both of Hilden; Toni Vogt, Krefeld; Juergen Geke, Duesseldorf, all of Germany

[73] Assignee: Henkel Kommanditgesellschaft auf Aktien, Duesseldorf, Germany

[21] Appl. No.: 341,607

[22] PCT Filed: May 11, 1993

[86] PCT No.: PCT/EP93/01154

§ 371 Date: Nov. 18, 1994

§ 102(e) Date: Nov. 18, 1994

[87] PCT Pub. No.: WO93/23337

PCT Pub. Date: Nov. 25, 1993

[30] Foreign Application Priority Data

May 18, 1992 [DE] Germany .......................... 42 16 352.8

[51] Int. Cl.⁶ ..................................................... C02F 5/10
[52] U.S. Cl. ............................. 210/696; 95/152; 95/189; 210/687; 210/697; 210/698; 210/699; 210/725; 210/728; 210/735; 210/930; 134/38; 427/331
[58] Field of Search ........................ 55/DIG. 46; 95/149, 95/189, 195–197, 152; 210/696–701, 712, 725, 727, 728, 735, 930, 687; 134/38; 427/331

[56] References Cited

U.S. PATENT DOCUMENTS

| | | | |
|---|---|---|---|
| 3,985,922 | 10/1976 | Thornton et al. | 95/149 |
| 4,220,456 | 9/1980 | Block | 55/85 |
| 4,380,495 | 4/1983 | Maher | 210/728 |
| 4,496,374 | 1/1985 | Murphy | 55/84 |
| 4,504,395 | 3/1985 | Harpel et al. | 210/712 |
| 4,541,931 | 9/1985 | Geke et al. | 210/728 |
| 4,564,464 | 1/1986 | Harpel et al. | 252/182 |
| 4,629,477 | 12/1986 | Geke | 55/85 |
| 4.629,572 | 12/1986 | Leitz et al. | 210/714 |
| 4,701,220 | 10/1987 | Seng | 106/203 |
| 4,933,091 | 6/1990 | Geke | 210/712 |
| 5,076,939 | 12/1991 | Hunter et al. | 210/930 |
| 5,250,189 | 10/1993 | Rey | 210/712 |
| 5,302,291 | 4/1994 | Miknevich | 210/930 |
| 5,326,480 | 7/1994 | Geke et al. | 210/730 |

FOREIGN PATENT DOCUMENTS

| | | |
|---|---|---|
| 0117586 | 9/1984 | European Pat. Off. . |
| 0168625 | 1/1986 | European Pat. Off. . |
| 0193668 | 9/1986 | European Pat. Off. . |
| 1517409 | 9/1969 | Germany . |
| 2758873 | 7/1979 | Germany . |
| 3405451 | 8/1984 | Germany . |
| 3316878 | 11/1984 | Germany . |
| 3421289 | 9/1985 | Germany . |
| 3412763 | 10/1985 | Germany . |
| 3810166 | 10/1989 | Germany . |
| 3817251 | 11/1989 | Germany . |
| 4025729 | 2/1992 | Germany . |
| 1512022 | 5/1978 | United Kingdom . |

OTHER PUBLICATIONS

"Oberfläache + JOT", 1986, No. 11, pp. 43 to 46.
"Römpp Chemie Lexihon", 9th Edition, vol. 3 (1990), pp. 1698 to 1700.

Primary Examiner—Peter A. Hruskoci
Attorney, Agent, or Firm—Ernest G. Szoke; Wayne C. Jaeschke; Daniel S. Oritz

[57] ABSTRACT

The invention is an improved process for denaturing and coagulating paint in an aqueous medium in which denatured and coagulated paint must remain in a dispersion in the aqueous medium. The aqueous medium contains a coagulant and the aqueous medium is maintained at an alkaline earth metal ion equivalent of less than 1.0 mmole/liter.

18 Claims, No Drawings

PROCESS FOR DENATURING AND COAGULATING PAINTS

FIELD OF THE INVENTION

This invention relates to a process for denaturing and coagulating paints and other organic coating materials, more particularly water-based systems, so-called "water-based paints", in circuit waters of wet separators for spray painting installations, more particularly of the type with sidestream disposal.

BACKGROUND OF THE INVENTION

In the application of paints and other organic coating materials to metal surfaces or plastic surfaces, for example in the automotive industry, it is not possible to apply the paints or coating materials completely to the parts to be coated. So-called overspray collects in the paint spraying booths, particularly in the painting of motor vehicles, and is taken up with water and flushed into so-called system basins. In order, on the one hand, not to disturb the operation of water-carrying pipe, nozzle and sprinkler systems, for example by tacky paint particles, and other hand to free the circulating water from the paint ingredients taken up, chemicals known as coagulants have to be added to the circuit water to coagulate the ingredients in question.

Various neutral and alkaline products are available for denaturing and coagulating conventional paints, above all paints used in the automotive industry.

In known process for coagulating paints and coating materials, the technical installations present largely determine whether a paint coagulant which floats the coagulate in the settling basin is used or whether a coagulant which sediments the coagulate is used. In the first case, the coagulate can be stripped from the surface of the water whereas, in the second case, the sedimented coagulates are removed from the bottom of the basin by means of a scraping belt. However, paint disposal lines where the denatured paint particles have to be kept in a uniform dispersion or suspension in the circuit water without precipitating the paint are being used to increasing extent. Accordingly, depending on the type and quality of paint, the specific behavior of the paint particles has to be influenced in each individual case in such a way that paint particles with a tendency towards flotation or sedimentation form a uniform dispersion or suspension. An overview of the problems involved in the coagulation of paints is provided by J. Geke in "Oberfläche+JOT", 1986, No. 11, pages 43 to 46.

RELATED ART

Various paint coagulants are available for coagulating conventional paints, particularly for use in the automotive industry. To coagulate and denature the paint particles and to agglomerate them into a dischargeable coagulate, powder-form or liquid, alkaline or neutral products are added to the circulating water in the prior art.

Thus, GB-A-1,512,022 describes flocculating agents, i.e. agents which agglomerate the particles under the effect of intermolecular bridge-forming macromolecules. These flocculating agents are made up of inorganic metal salts (iron chloride or aluminium sulfate), which act as precipitants, and organic cationic polymers, such as polyvinyl pyridine or polyamines, in aqueous solution.

DE-A-33 16 878 describes liquid one-component coagulants containing calcium and/or magnesium nitrates, chlorides and/or sulfates and also polyethylene imines cationically modified by protonation or alkylation.

Hitherto, the disposal of two-component polyurethane paints in particular has always presented difficulties. To dispose of mists of such paints and coating materials, DE-A-34 12 763 proposes coagulants containing cyanamide and/or dicyanodiamide and/or cyanamide salts in conjunction with materials typically used in paint coagulants.

Recently, layer silicates of various types, such as bentonites (U.S. Pat. No. 4,220,456), hectorites (EP-B-193 668), montmorillonites (U.S. Pat. No. 4,629,572), kaolins (U.S. Pat. No 4,380,495) or smectites (U.S. Pat. No. 4,701,220), have bee used for denaturing and coagulating paints. According to DE-C-38 17 251, other types of alumina, particularly boehmite or pseudoboehmite, may also be used for denaturing and sedimenting paints.

In addition, it is known from U.S. Pat. No. 4,496,374 and from EP-A-117 586 that talcum in combination with calcium oxide, hydroxide, carbonate and/or zinc stearate may be used to coagulate and sediment high-solid paints. In addition, it is known from DE-C-34 21 289 and from DE-C27 58 873 that wax, particularly montan wax or carnauba wax, in combination with paraffins derivatives may be used to denature and coagulate synthetic resin paint particles in wet separators of spray painting installations.

Water-based concentrates containing an ethylene/acrylic acid copolymer for coagulating paints and other organic coating materials are known from DE-A-38 10 166.

The alkali metal salts known from DE-A-15 17 409, such as hydroxides, carbonates and/or hydrogen carbonates, may also be used as active substances in coagulants.

Due to solvent emissions in painting with solvent-containing paints and to more stringent legal requirements relating to waste air from paint shops, there is now a trend towards water-based paints. The water-soluble or water-dispersible binders of water-based paints (hereinafter referred to in short as "water paints") generally differ in their coagulating or flocculating properties from solvent-based paints owing to the hydrophilic groups. Thus, water-soluble binders, of which the solubility is mostly attributable to carboxylate late groups, may generally be converted by reaction with polyvalent cations, such as for example calcium, magnesium, aluminium, iron (II) and iron (III), into water-insoluble salts which flocculate from the aqueous solutions. Accordingly, part of the water-soluble paint can actually be precipitated by the polyvalent cations present in process water. This effect which, basically, is advantageous where coagulation is carried out in conventional coagulation systems (for flotation or sedimentation) is a serious disadvantage in modern installations with sidestream disposal. This is because, in coagulation with sidestream disposal, the denatured paint particles introduced into the circulating water initially remain in suspension and are only flocculated and discharged by addition of flocculants in a sidestream branched off from the circuit.

At present, the products mentioned above, which contain bentonites activated for example with alkali metal carbonates, are normally used for coagulating paints. These so-called active bentonites are produced by intensive mixing of natural calcium bentonites with alkali metal salts. Under the effect of the intensive mixing, the calcium ions in the lattice interlayers of the layer silicates are exchanged for alkali metal ions. During working up, however, the entire calcium content remains in the bentonite. Accordingly, where bentonites thus activated are used for coagulating water paints, more particularly in installations with sidestream disposal, unwanted premature precipitation of a more or less large part of the water-soluble binder is precipitated into the coagulation basin under the effect of the hardness of the coagulation water. This results in a deterioration in operational reliability, in high cleaning costs and in a relatively poor coagulation yield, particularly with a view to paint recycling/ utilization.

Accordingly, the problem addressed by the present invention was to provide a process which would guarantee not only complete denaturing and coagulation, more particularly of water paints and other organic water-based coating materials, but also adequate dispersion or suspension of the denatured paint particles in the circuit water. Accordingly, the primary objective of the present invention was to keep the denatured paint particles suspended in the circuit water. In addition, the process according to the invention would lend itself to use in particular in modern installations with coagulate disposal in separate flocculation systems (for example the so-called "ESKA" installations), in which the denatured paint particles neither float nor sediment in the circuit water, but instead have to be kept dispersed or suspended. In addition, the process according to the invention would also be suitable for the coagulation and disposal of conventional solvent-based paint systems.

BRIEF DESCRIPTION OF THE INVENTION

Accordingly, the present invention relates to a process for denaturing and coagulating paints and other organic coating materials, more particularly water-based paint systems ("water paints"), in circuit waters of wet separators for spray painting installations, paint coagulants known per se being added to the circuit water, characterized in that the water hardness of the circuit water is adjusted to values of 0 to 1.0 mmole/1 alkaline earth metal ion equivalents.

It has surprisingly been found that dispersible paint residues disposable by adsorption can be formed if the hardness of the circuit water is adjusted to values in the range mentioned above. In particular, the unwanted premature precipitation of water paints can be reduced or even completely avoided in this way without any adverse effect on the denaturing and coagulation of the paint overspray.

In one preferred embodiment of the invention, the hardness of the circuit water is adjusted to values of 0 to 0.2 mmole/1 alkaline earth metal ion equivalents.

DETAILED DESCRIPTION OF THE INVENTION

A definition of the term "water hardness" as used herein can be found in the relevant prior art literature, for example in "Römpp Chemie Lexikon", 9th Edition, Vol. 3 (1990), pages 1698 to 1700, keyword "water hardness". According to this definition, salts of calcium and magnesium are the most important hardness salts responsible for the hardness of water. In addition, under this definition, 1 mmole/1 alkaline earth metal ions corresponds to approximately 5.6° d (degrees of German hardness).

The following coagulants known per se, for example, may be used in the process according to the invention:

The coagulants may contain, for example, one or more alkali metal layer silicate(s), for example the compounds known from U.S. Pat. No. 4,220,456, U.S. Pat. No. 4,629,572, U.S. Pat. No. 4,380,495 and U.S. Pat. No. 4,701,220 and from EP-B-193 668, which in preferred embodiments emanate from the group of bentonites, hectorites, montmorillonites and/or kaolins.

Combinations of bentonite and kaolin or of bentonite and hectorite in coagulants have a very favorable coagulation potential. One-component paints, polyester paints or one-component polyurethane paints of the high-solid type, which hitherto could never be completely denatured and coagulated, can now be completely removed from the circuit water of spraying booths with coagulants containing a combination of the above-mentioned layer silicates.

In addition, the following paint coagulants known from the literature may be used for the purposes of the present invention:

Aqueous wax dispersions which, according to DE-C-27 58 873 and DE-C-34 21 289, consist essentially of montan wax, carnauba wax and/or paraffin derivatives;

Aqueous concentrates of ethylene/acrylic acid copolymers which, according to DE-A-38 10 166, consist of 8 to 25% by weight of acrylic acid units and 92 to 75% by weight of ethylene units, based on the acid form of the copolymer, and which are present as the salt of an inorganic or organic base, preferably in the form of alkali metal, ammonium, amine or alkanolamine salts;

Aqueous talcum dispersions which, according to EP-B-117 586, DE-A-34 05 451 and U.S. Pat. No. 4,496,374, consist essentially of talcum, water-soluble polyhydroxy compounds and zinc stearate;

Aqueous alumina dispersions which, according to DE-C-38 17 251, contain pseudoboehmite or boehmite alumina ($Al_2O_3$) together with conventional antifoam agents.

Together with or instead of one or more of the above-mentioned materials typically present in paint coagulants, the coagulants may contain polyethylene imines cationically modified by protonation or alkylation. The polyethylene imines are cationically modified, i.e. converted into the corresponding ammonium salts, either by protonation or by alkylation, generally by methylation of the nitrogen. The degree of modification is variable and depends upon the neutral starting polymer, upon the corresponding acid used for protonation or upon the corresponding alkylating agent used for alkylation. Tertiary nitrogen atoms of such polymers are not completely protonated or alkylated. Protonated and/or alkylated, preferably methylated, polyethylene imines with molecular weights of $5\times10^4$ to $5\times10^7$ and preferably in the range from $7.5\times10^4$ to $5\times10^6$ (see, for example, DE-A-33 16 878), may be used.

The coagulants may also contain molybdates, more particularly water-soluble molybdate salts—in preferred embodiments of the invention alkali metal and/or ammonium salts of molybdic acid and/or isopolymolybdic acid. Of these molybdates, sodium or ammonium molybdates, more particularly $Na_2MoO_4$, are particularly preferred. Coagulants containing sodium molybdates in addition to other constituents typically encountered in coagulants are capable of completely denaturing and removing mists even of those paints which would have been regarded as difficult, if not impossible, to treat with known coagulants (cf. DE-A-40 25 729).

Even though excellent results can be obtained with coagulants corresponding in their composition to the foregoing description, it is also possible in principle to meet special requirements by adding other typical active substances and/ or auxiliaries to these coagulants. For example, the coagulants may contain the components known from DE-A-34 12 763, such as cyanamide and/or dicyanodiamide and/or cyanamide salts. Where cyanamide or dicyanodiamide (1-cyanoguanidine) is used, extremely effective coagulation of paints and other organic coating materials, more particularly two-component polyurethane paints, can be achieved when the cyanamide or dicyanodiamide are present in the circuit water of paint spraying booths, i.e. in aqueous solution, at pH values of 3 to 12 and preferably in the range from 6.5 to 8.5.

Other special requirements paint coagulants are expected to satisfy may include, for example, the adjustment of a certain pH value or the antimicrobial potential of the coagulants. A suitable additive for this purpose is, for example, boric acid which has antimicrobial activity and which may even contribute towards pH adjustment. Additions of phosphoric acid, organic acids, such as citric acid, or other non-corrosive acids or salts thereof may optionally be used for pH adjustment. Basic compounds, such as alkali metal hydroxides, amines or alkanolamines, are preferably used for the pH adjustment of acidic solutions. Biocides may also be used in addition to or instead of these compounds. Examples of biocides are formaldehyde, isothiazolines and derivatives thereof, such as pyridine-N-oxide and its derivatives.

Other possible constituents of the coagulants are corrosion inhibitors and additional antifoam agents. Water-soluble salts of phosphonic acids and zinc salts, preferably the sodium salt of 2-phosphonobutane-1,2,4-tricarboxylic acid or the zinc salt of 2-pyridinethiol-1-oxide, are used as corrosion inhibitors. Besides known antifoam agents, Dehydran F® (a product of Henkel KGaA) has been successfully used as an antifoam agent.

In one preferred embodiment of the invention, the paint coagulants used contain at least one of the following components a) to h) as active ingredients:

a) layer silicates, preferably from the group of montmorillonites, bentonites, hectorites or kaolins, b) waxes, preferably in the form of an aqueous dispersion, c) ethylene/acrylic acid copolymers which contain 8 to 25% by weight of acrylic acid units and 92 to 75% by weight of ethylene units, based on the acid form of the copolymer, and which are present as the salt of an inorganic or organic base, preferably in the form of an aqueous concentrate, d) talcum, e) alumina, f) polyethylene imines and/or protonated or alkylated derivatives of polyethylene imine, g) water-soluble alkali metal and/or ammonium salts of molybdic acid and/or isopolymolybdic acid and h) polyelectrolytes based on quaternary methacrylates, for example those of the ROHAFLOC® series (Röhm GmbH).

In another preferred embodiment of the invention, the coagulants mentioned above additionally contain at least one of the following components i) to k):

i) a compound from the group consisting of cyanamide, dicyanodiamide or cyanamide salts, preferably dicyanodiamide, j) a hydroxide, carbonate or hydrogen carbonate of the alkali metals, k) active substances and/or auxiliaries typical of paint coagulants, preferably biocides, pH regulators, corrosion inhibitors, antifoam agents or solubilizers.

The production of the paint coagulants from the individual components is familiar to the expert from the prior art.

The coagulants are introduced either continuously by means of suitable, optionally automatable metering systems or discontinuously, for example once a day. The coagulants are added to the circuit water in a quantity of 0.5 to 40% by weight and preferably in a quantity of 1.0 to 10% by weight of active substance, based on paint overspray. In this connection, the term "active substance" applies solely to the coagulating agents mentioned and not to auxiliaries which do not have any coagulating effect on their own. According to the invention, the quantities in which the coagulants are used are preferably selected so that, in the case of solid products, they are in the range from 1 to 10% by weight and, in the case of liquid products, in the range from 3 to 30% by weight (again expressed as active substance), based on paint overspray. The concentration of active substance in the circuit water should preferably be of the order of 1 to 3 g/l. So far as metering is concerned, it is important in overall terms to ensure that enough coagulant is present in the circuit waters to guarantee complete denaturing of the paint particles.

In the practical application of the process according to the invention, the pH value of the circuit water may vary over a wide range, for example from pH 2 to pH 12. However, pH values in the range from pH 5 to 9 are preferred for the purposes of the invention, pH values in the range from 6 to 8.5 being particularly preferred.

According to the invention, the hardness of the circuit water may generally be adjusted by using a suitably "soft" water, which already has water hardness values in the range mentioned, from the outset as the circuit water. Depending on local conditions, "soft" waters such as these are either already available in the form of natural waters (process waters) or may be obtained in known manner by softening of "hard" waters, for example by deionization thereof. Further information on this subject can be found in the relevant prior art literature, for example in the above-cited "Römpp Chemie Lexikon".

However, the softening of "hard" waters can be extremely expensive, particularly for the application envisaged in the present context, so that this option is generally not acceptable to the user of the process according to the invention. Accordingly, another preferred embodiment of the present invention is characterized in that the hardness of the circuit water is adjusted to values in the ranges mentioned by addition of so-called "hardness binding agents" to the circuit water. In the context of the invention, "hardness binding agents" are generally understood to be substances which enable the hardness of the circuit water to be reduced to values in the ranges mentioned either by precipitation or by complexing of the alkaline earth metal ions responsible for hardness.

Thus, the following substances, for example, may be used as hardness-binding agents in accordance with the present invention: alkali metal hydroxides, alkali metal carbonates, alkali metal hydrogen carbonates, alkali metal silicates, alkali metal phosphates, alkali metal polyphosphates, complexing agents for alkaline earth metal ions and/or ion exchangers which are capable of binding alkaline earth metal ions. According to the invention, the alkali metals mentioned in this list are meant to be sodium and/or potassium, but especially sodium. Examples of the compounds mentioned above are sodium hydroxide, potassium hydroxide, soda, sodium hydrogen carbonate, soda waterglass, sodium orthophosphate, sodium pyrophosphate and sodium triphosphate (also known as sodium tripolyphosphate). According to the invention, suitable complexing agents are any of the complexing agents or sequestrants known from the prior art which are capable of complexing the salts responsible for the hardness of water, preferably calcium and/or magnesium salts. Examples of this class of compounds are sodium triphosphate, zeolitic alkali metal alumosilicates, for example zeolite A (SASIL®, a product of Henkel KGaA) or zeolite X, aminopolycarboxylic acids, for example nitrilotriacetic acid (NTA) or ethylenediamine tetraacetic acid (EDTA), phosphonic acids, for example ethane-1-hydroxy-1,1-diphosphonic acid (EHDP), amino-tris-(methylenephosphonic acid) (ATMP) or 2-phosphonobutane-1,2,4-tricarboxylic acid and water-soluble salts of the acids mentioned, particularly their sodium salts.

According to the invention, the complexing agents or sequestrants mentioned above are preferably used as the hardness binding agents.

The quantity of hardness binding agents to be used cannot be stated in general terms because the quantity to be added is of course dependent above all on the hardness of the process water used as the circuit water. Generally speaking, hardness binding agents are added to the circuit water in the quantity necessary to adjust the hardness of the circuit water to values in the ranges mentioned above. In individual cases, the expert will determine the particular quantity required by simple tests. For the complexing agents mentioned above, it is generally sufficient to use these hardness binding agents in a quantity of 0.05 to 0.5% by weight, based on the quantity of circuit water.

In addition, it has been found that even the addition of alkali metal layer silicates poor in alkaline earth metals to the circuit water leads to a reduction in its hardness. Accordingly, alkali metal layer silicates poor in alkaline earth metals, which may also be used with advantage as an effective coagulant, are also regarded to a certain extent as hardness binding agents in the context of the present invention. However, the hardness-binding capacity of alkali metal layer silicates is generally not sufficient to reduce the hardness of the circuit water to values in the ranges mentioned above.

According to the invention, therefore, it is preferred to add alkali metal layer silicates poor in alkaline earth metals to the circuit water in addition to the hardness binding agents. This may be achieved, for example, by using the alkali metal layer silicates as coagulants. It is of course also possible in accordance with the present invention to use others of the above-mentioned coagulants and to reduce the hardness of the circuit water by addition of the alkali metal layer silicates and/or others of the hardness binding agents mentioned.

Suitable alkali metal layer silicates poor in alkaline earth metals are, for example, natural alkali metal bentonites of low calcium content (below 1.5% by weight), for example the commercial products Portaclay A 90, Quarzwerke GmbH, Frechen. According to the invention, alkali metal layer silicates containing less than 2% by weight of alkaline earth metal ions are preferably used.

Alkali metal layer silicates such as these poor in alkaline earth metals are preferably used in a quantity of 0.5 to 10% by weight and more preferably in a quantity of 1 to 4% by weight, based on paint overspray.

The paint particles can advantageously be completely denatured by the process according to the invention. The denatured paint particles can be agglomerated into small flocs which do not adhere to the pipes, pumps and tanks, but instead are uniformly distributed in the dispersion or suspension and can be readily disposed of, even by automatic systems. This particular feature is of considerable advantage for the automatic paint disposal lines operating on the basis of adsorptive disposal of the paint oversprays (for example "ESKA" systems) which are being used to an increasing extent.

ESKA systems with sidestream disposal are manufactured, for example, by the Dürr, Eisenmann and Fläkt companies. In systems such as these, the denatured paint particles introduced into the circuit water remain in suspension and are only flocculated and discharged by addition of flocculants in a sidestream branched off from the circuit. In the practical application of the process according to the invention, the paint coagulates may readily be reprecipitated or flocculated by the subsequent addition of, for example, calcium salts (calcium nitrate).

The invention is illustrated by the following Examples.

EXAMPLES

Reduction of Water Hardness by Addition of Hardness Binding Agents

The hardness binding agents listed in Table 1 were added in a quantity of 0.1% by weight—corresponding to Examples 1 to 6—to waters with hardnesses of 5° d and 16° d (corresponding to around 1/3.1 mmole/l alkaline earth metal ions) of the following Reference Examples 1 and 2.

Table 1 below shows the change in hardness after addition of the particular hardness binding agents mentioned while the values of Reference Examples 1 and 2 show the hardness values of the water used without the hardness binding agents.

TABLE 1

| Examples | | Total hardness [°d] | Calcium content [mg/l] | Magnesium content [mg/l] |
| --- | --- | --- | --- | --- |
| Ref. Ex. | 1 | 5 | 30 | 3.0 |
| | 1* | 3.2 | 18.8 | 2.4 |
| | 2** | 3.8 | 22.2 | 3.2 |
| | 3*** | <1 | 0.1 | 0.1 |
| | 4**** | <1 | <0.1 | <0.1 |
| Ref. Ex. | 2 | 16 | 94 | 12.3 |
| Comp. | 1* | 12.7 | — | — |
| Comp. | 2** | 11.5 | 61 | 12.9 |
| | 5*** | 4.0 | 11.4 | 10.2 |
| | 6**** | 2.9 | 10.1 | 6.5 |

*A natural sodium bentonite (Portaclay ® A90, a product of Quarzwerke GmbH, Frechen) was used as the hardness binding agent
**Sodium triphosphate was used as the hardness binding agent
***A sodium aluminium silicate (Wessalith ® P, a product of DEGUSSA AG) was used as the hardness binding agent
****A sodium aluminium silicate (zeolite X) was used as the hardness binding agent.

Precipitation for Various Water Hardness Values

Investigation of the precipitation of a water paint (BASF, Glacier Blue, concentration 5 g/l) in water with various hardness values showed that no coagulation occurred at very low hardness values whereas a large part of the flocculatable paint constituents precipitated at hardness values of more than 5° d. The paint binder was almost completely coagulated beyond 10° d, as reflected in the fact that there was no further increase in the volume of sediment, even at higher hardness values. The sediment volume was determined by means of an Imhoff funnel. The Imhoff funnel is an acute-angled, conical glass vessel with a volume of 1 liter and exact volume markings. After the previously homogenized solutions had been poured into the Imhoff funnel, the volume of sediment was read off after certain time intervals.

The results obtained are set out in Table 2 below.

TABLE 2

| Hardness (actual) [°d] | Sediment volume in an Imhoff funnel after | | Clear phase | Water hardness of the clear phase |
|---|---|---|---|---|
| | 10 mins. [ml] | 30 mins. [ml] | | |
| <0.1 | 2.5 | 4 | Fine flocs, cloudy | 1.1 |
| 4.6 | 30 | 22 | Coarse flocs, non-transparent blue | 5.3 |
| 9.2 | 35 | 25 | Coarse flocs, non-transparent blue | 9.6 |
| 14.4 | 33 | 23 | Coarse flocs, non-transparent blue | 14.2 |
| 18.6 | 38 | 27 | Coarse flocs, non-transparent blue | 18.8 |

TABLE 2-continued

| Hardness (actual) [°d] | Sediment volume in an Imhoff funnel after | | Clear phase | Water hardness of the clear phase |
|---|---|---|---|---|
| | 10 mins. [ml] | 30 mins. [ml] | | |
| 15.0 (PW) | 35 | 26 | Coarse flocs, non-transparent blue | 14.6 |

(PW = process water: the hardnesses of the other waters used were adjusted to the values shown with calcium and magnesium ions (as nitrate)).

Preventing the Precipitation of Coagulate by Addition of Hardness Binding Agents The hardness binding agents listed in Table 3 were added to water with a hardness of 15° d. A water paint (BASF, Glacier Blue) was added in a concentration of 5 g/l, followed by stirring for 10 minutes at 250 r.p.m.

The results obtained are set out in Table 3 below. In Table 3,

Sasil®=Zeolite NaA (Henkel KGaA)

Zeolite X (Henkel KGaA)

Portaclay® A 90=Sodium bentonite (Quarzwerke GmbH)

Trilon® A =Nitrilotriacetic acid sodium salt (NTA)

Active bentonite =Calcium bentonite activated with sodium carbonate (Erbslöh)

* The following comments apply to these tests: although in the case of NTA the cations are complexed, they are still picked up by the analysis method used (atomic absorption spectrometry). Accordingly, the hardness values shown in Table 3 are not representative of the effect of NTA in the context of the present invention; a more accurate picture is provided by the values relating to the sediment volume.

TABLE 3

| Example | 15° d Water plus hardness binding elements | Hardness [d] | Sediment volume in an Imhoff funnel after | | Clear phase |
|---|---|---|---|---|---|
| | | | 10 mins. [ml] | 30 mins. [ml] | |
| Ref. Ex. 3 | No addition | 14.4 | 33 | 23 | Alu particles sediment, blue suspension |
| 7 | 2 g/l Sasil ® | <0.1 | 3.5 | 4 | Alu particles sediment, blue suspension |
| 8 | 2 g/l Zeolite X | 0.2 | 5 | 7 | Alu particles sediment, blue suspension |
| 9 | 2 g/l Sodium phosphate | 0.5 | 2 | 7 | Finely dispersed particles, no sediment |
| 10 | 1 g/l Active bentonite + 2 g/l Sasil ® | <0.1 | 3.5 | 5.5 | Paint in suspension, totally opaque |
| 11 | 1 g/l Active bentonite + 2 g/l Zeolite X | 0.2 | 4.5 | 6 | Paint in suspension, totally opaque |
| 12 | 1 g/l Active bentonite + 2 g/l sodium phosphate | 0.5 | 2 | 15 | Paint in suspension, totally opaque |
| Comp. 3* | 2 g/l Trilon ® A | 13 | 1 | 1 | Blue, slightly cloudy |
| Comp. 4 | 1 g/l Portaclay ® A 90 | 12.9 | 90 | 85 | Clear-blue |
| Comp. 5 | 2 g/l Portaclay ® A 90 | 12.0 | 100 | 150 | Clear-blue |
| Comp. 6 | 5 g/l Portaclay ® A 90 | 9.5 | 700 | 400 | Cloudy-blue |
| Comp. 7 | 1 g/l Active bentonite | 13.2 | 50 | 30 | Very fine flocs and sedim. metal particles |
| Comp. 8* | 1 g/l Active bentonite + 2 g/l Trilon ® A | 14.4 | 1 | 2 | Paint in suspension, totally opaque |

Flocculation of the Suspension

By adding an excess of water-soluble calcium nitrate, the suspension of the water paint was flocculated in all the Examples through the increase in the water hardness.

We claim:

1. In a proceed for denaturing and coagulating organic coating materials including water-based paint particles, by contacting the organic coating material with circuit water in a wet separator for spray painting installations, containing a coagulating effective amount of coagulants to denature and coagulate said coating material the improvement which comprises: maintaining hardness of the circuit water at a value of 0 to 1.0 mmole/l alkaline earth metal ion equivalents to keep the denatured and coagulated coating materials suspended in the circuit water, wherein the coagulant contains as an active constituent at least one composition selected from the group consisting of layer silicates, waxes, ethylene/acrylic acid copolymers which contain 8 to 25% by weight of acrylic acid units and 92 to 75% by weight of ethylene units, based on the acid form of the copolymer, and which are present as the salt of an inorganic or organic base, talcum, alumina, polyethylene imines, protonated polyethylene imine, alkylated polyethylene imine, water-soluble alkali metal salts of molybdic acid, ammonium salts of molybdic acid, alkali metal salts of isopolymolybdic acid, ammonium salts of isopolymolybdic acid and polyelectrolytes comprising quaternary methacrylates - has been inserted.

2. The process as claimed in claim 1, wherein the hardness of the circuit water is maintained at from 0 to 0.2 mmole/l alkaline earth metal ion equivalents.

3. The process of claim 2 wherein the coagulant additionally contains at least one component selected from the group consisting of cyanamide, dicyanodiamide, cyanamide salts, alkali metal hydroxide, alkali metal carbonate, alkali metal hydrogen carbonate, biocides, pH regulators, corrosion inhibitors, antifoam agents and solubilizers.

4. The process of claim 2 wherein the coagulants are added to the circuit water in an amount of 0.5 to 40% by weight of active substance, based on the weight of paint overspray.

5. The process of claim 2 wherein the pH of the circuit water is in the range from 2 to 12.

6. The process as claimed in claim 1, wherein the coagulant additionally contains at least one composition selected from the group consisting of cyanamide, dicyanodiamide, cyanamide salts, alkali metal hydroxide, alkali metal carbonate, alkali metal hydrogen carbonate metals, biocides, pH regulators, corrosion inhibitors, antifoam agents and solubilizers.

7. The process as claimed in claim 1 wherein the coagulants are added to the circuit water in an amount of 0.5 to 40% by weight of active substance, based on the weight of paint overspray.

8. The process of claim 7 wherein the coagulants are added to the circuit water in an amount of from 1.0 to 10% by weight of active substances based on the weight of paint in the circuit water.

9. The process as claimed in claim 1 wherein the pH of the circuit water is in the range from 2 to 12.

10. The process of claim 6 wherein the pH of the circuit water is from 5 to 9.

11. The process of claim 1 wherein the hardness of the circuit water is maintained by addition of a hardness binding agent.

12. The process as claimed in claim 11, wherein the hardness binding agent comprises at least one member selected from the group consisting of alkali metal hydroxides, alkali metal carbonates, alkali metal hydrogen carbonates, alkali metal silicates, alkali metal phosphates, complexing agents for alkaline earth metal ions and ion exchangers.

13. The process as claimed in claim 12, wherein the complexing agent comprises at least one member selected from the group consisting of zeolitic alkali metal aluminum silicates, aminopolycarboxylic acids, water-soluble salts of amino polycarboxylic acids, phosphonic acids and water-soluble salts of phosphonic acid.

14. The process as claimed in claim 11 wherein the complexing agents are added to the circuit water in an amount of 0.05 to 0.5% by weight, based on the weight of circuit water.

15. The process as claimed in claim 1 wherein hardness binding agents comprising alkali metal layer silicates, containing less than 2% by weight of alkaline earth metals, are added to the circuit water.

16. The process as claimed in claim 15, wherein alkali metal layer silicates containing less than 1.5% by weight of alkaline earth metals are added to the circuit water.

17. The process as claimed in claim 15 wherein the alkali metal layer silicates are added to the circuit water in an amount of 0.5 to 10% by weight based on the weight of paint overspray to be collected.

18. The process of claim 17 wherein the alkali metal layer silicates are added to the circuit water in an amount of from 1 to 4% by weight based on paint overspray to be collected.

* * * * *